Dec. 10, 1957  E. BURSTEIN  2,816,232
GERMANIUM FAR INFRA-RED DETECTOR
Filed July 9, 1953
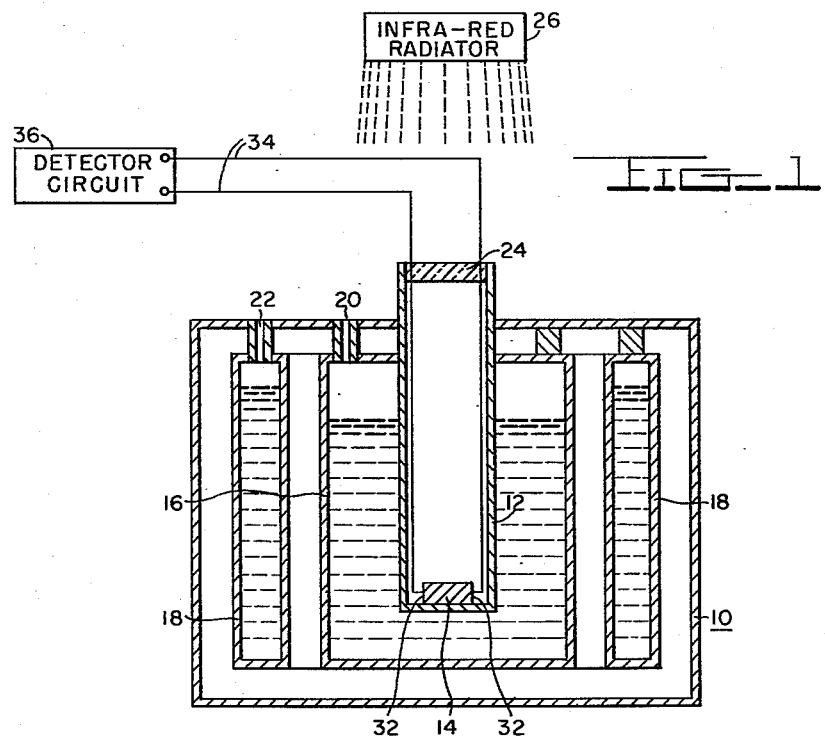
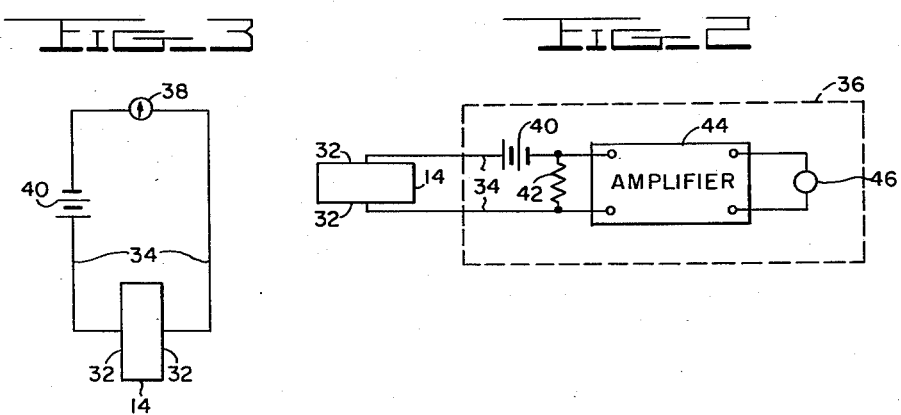
INVENTOR
ELIAS BURSTEIN
BY
ATTORNEYS

United States Patent Office

2,816,232
Patented Dec. 10, 1957

2,816,232

GERMANIUM FAR INFRA-RED DETECTOR

Elias Burstein, Alexandria, Va., assignor to the United States of America as represented by the Secretary of the Navy Application July 9, 1953, Serial No. 367,122

4 Claims. (Cl. 250—83.3)

(Granted under Title 35, U. S. Code (1952), sec. 266)

This invention relates in general to infra-red detectors and in particular to photoconductive materials suitable for use in the far infra-red spectrum.

In the earlier prior art far infra-red detectors utilizing heteropolar substances such as PbS, PbTe and PbSe, have been limited in their spectral response to a maximum wavelength of about 6 microns. More recent prior art discloses the conventional utilization of substances similar to the above has been superseded by the utilization of doped homopolar substances such as silicon or germanium which have been doped with impurities from columns III and V of the periodic table such as boron, aluminum, gallium, indium and nitrogen, phosphorous, arsenic, antimony, etc. In this more recent prior art the effect of reduced temperature on the characteristics of the photoconductors has been applied. There have been reductions to as low as liquid hydrogen (−259°) and in the most recent embodiment to almost absolute zero (liquid helium −272.2°), see my copending application Serial No. 280,154, filed April 2, 1952 for Infra-Red Detector, now U. S. Patent 2,671,154.

All of the prior art is limited in either spectral response or sensitivity although the later embodiment with its reduced temperature requirement is less limited than the rest.

Accordingly, it is an object of this invention to provide an infra-red photoconductive detector having a spectral response to a wavelength of at least 38 microns and a low equivalent noise input value in this region of the infra-red band.

It is another object of this invention to provide a satisfactory homopolar material doped with appropriate impurities capable of being used as photoconductors in the far infra-red portion of the spectrum.

Still another object of this invention is to provide a far infra-red radiation detector utilizing the photoconductive properties of impure semi-conductors.

These and other objects of this invention will become apparent from a better understanding of the invention for which reference is to be had to the attached drawings and description of this invention.

In the accompanying drawings:

Figure 1 represents a schematic drawing of a typical detector cell used in this invention.

Figure 2 represents a partial schematic drawing of a typical circuit which may be used with this invention.

Figure 3 represents a schematic and block diagram of another typical circuit to be used with this invention.

The invention comprises a far infra-red radiation detector utilizing a homopolar compound such as germanium to which impurities in the form of acceptor atoms, such as zinc or copper may be added. The homopolar substance used and the type of impurities added determine the wavelength range to be detected. The temperature at which the detector is kept and the amount of impurities added determine its sensitivity. Far infra-red radiation impinging upon the doped homopolar substance which is kept at liquid helium temperature causes photoconductivity to take place in a body of this substance and an external circuit is coupled to the homopolar substance to measure its change in conductivity as produced by the infra-red radiation. This change in conductivity of the substance causes a change in the current flow in the external circuit and this change in current flow is amplified and detected. Provision may be made to filter out all the radiation other than the infra-red band that is desired to be detected so that the photocurrent detected is definitely correlated solely with radiation in the infra-red band selected. Provision may be made either to chop the incoming radiation or to use scanning techniques to obtain radiation intensity variations at various frequencies to facilitate amplification and detection of small photocurrents. For more intense radiations producing larger photocurrents, a D. C. circuit may be utilized.

With further reference to the drawings.

The temperature reducing device and the detector circuits are substantially the same as those disclosed in my copending application (supra). Specifically, in Figure 1 a detector containing unit 10 comprises an inner container 12 which may be made of glass, plastic or any low thermal conductivity metal. Said inner container holds a body 14 of photoconductive material. This inner container is held within a double Dewar including a long inner Dewar 16 containing liquid helium and an outer Dewar 18 containing liquid nitrogen. The walls of the Dewars should be of glass or of a metal having low thermal conductivity, such as stainless steel, covered with highly polished copper plated surfaces and supported by the outer frame 10 by supports of metal having low heat conductivity, for example, an alloy containing 80% Ni, 5% iron and 15% Cr might be used. One of the supports 20 is pipe-shaped to act as an inlet for the liquid helium. Another support 22 for the outer Dewar acts as an inlet for the liquid nitrogen. The inner container is thus exposed to the liquid helium temperature of the inner Dewar 16, thereby maintaining sensitive body 14 substantially at liquid helium temperature. The inner container 12 is filled with helium gas to exclude air and water vapor which may otherwise condense on the sample and possibly absorb and scatter incoming radiation, and also to provide better heat transfer to the sample. A window 24 is provided at the outer end of the inner container 12. The window is of a material that transmits infra-red radiation from an infra-red radiator (indicated as 26) in the radiation band that is being detected. For example NaCl is suitable up to about 17 microns, KBr may be used to transmit up to 30 micron wavelengths, KRS—5, which is a mixture of thallium bromide and thallium iodide, may be used when radiation up to 40 microns is detected, and quartz ($SiO_2$) is used for wavelengths beyond 40 microns. The sensitive body 14 is placed in the direct optical path formed by the radiator 26, the window 24 and the inner container 12. Transmission filters may be inserted along the optical axis if desired. Body 14 is preferably shaped like a rectangular section having a thickness inversely proportional to the coefficient of optical absorption of the material, and has one surface substantially normal to the path of the incoming radiation. A doped germanium specimen which might be used in this invention as body 14 may typically have a length of 1 centimeter and width and thickness of 5 millimeters.

The photoconductive body 14 is composed of a homopolar material which includes from about $10^{13}$ to about $10^{18}$ acceptor impurity atoms per cm.³. These impurity atoms may comprise acceptor atoms from group I elements such as copper, or from group II elements such as zinc. Specifically, if body 14 is composed of germanium it may contain zinc impurities in the range of $10^{13}$ to about $10^{18}$ atoms per cm.³ or copper impurities in the range of $10^{13}$ to about $10^{16}$ atoms per cm.$^3$ to give the detector a spectral response in the region of 39 microns and 29 microns respectively.

The addition of acceptor impurities in the range of concentration cited causes the formation of an impurity energy level separated from the filled energy band of the pure element, germanium, by about .03 electron volts for zinc and about .04 electron volts for copper. This value compares with the energy separation between the filled band and the conduction band of 0.76 electron volts for pure germanium.

Two parallel faces of the sensitive body are electroded, preferably with rhodium electrodes 32, which may be electroplated on the sensitive material. Leads 34 couple these electrodes to a suitable detector circuit 36, which provides a means for measuring the photocurrent developed as a result of the radiation impinging upon the body 14.

Provision may be made to provide light choppers with opaque or selectively transmitting blades or some other optical means in order to cause a modulated radiation signal to be incident upon the photoconductor, and thereby provide a varying photocurrent that can be amplified by an A. C. system and detected independently of the steady thermal background radiation due to the window. Lenses and reflectors may also be provided to focus the radiation onto the photoconductor 14.

In Figure 2, which shows an example of a detector circuit which may be used with this invention, a potential is applied across the photoconductive body 14 by means of leads 34 coupling a source of D. C. voltage 40 to the electrodes 32 on the specimen 14 through a load resistor 42. An amplifier 44 is connected across load resistor 42 to amplify the change in current produced in the circuit due to a change in the conductivity of body 14 in response to a change in the amount of infra-red radiation impinging upon it. A detector 46 is provided for detecting the output from amplifier 44.

Figure 3 shows a simple D. C. circuit which may be used for detecting higher intensity radiation sources. In Figure 3 a D. C. voltage source 40 is applied across the electrodes 32 electroded on photoconductor 14. A D. C. current indicator 38 provides an indication of the photocurrent produced due to radiation impinging on the photoconductor 14.

Typical values for a germanium specimen containing $10^{16}$ zinc acceptor atoms per cm.$^3$ at liquid helium temperature with 1 cm. between electrodes are: $-10^8$ ohms dark resistance in the presence of background radiation alone, load impedance in the form of a resistance or a tuned L—C impedance of $10^7$ ohms and an electric field voltage applied to the specimen of about 150 volts/cm. It is to be noted that the type of impurities in the germanium determines the amount of voltage to be applied in this invention. For germanium containing a low concentration of copper, field voltages as low as 10 volts/cm. must be used.

It must be understood that the use of a substantially liquid helium temperature is essential in order to obtain optimum results with the doped germanium. It is only at these extremely low temperatures that much of the residual conductivity due to the free charge carrier impurities present in the body 14 is frozen out so that the photoconductivity effects are not masked by the inherent conductivity. In some germanium specimens while the optimum operating temperature is that of liquid helium, the temperature at which the specimen is operative may be increased as the specimen is purified up to a maximum temperature which is still somewhat below that of liquid hydrogen.

It has been demonstrated that certain photoconductors which are intrinsic photoconductors in the infra-red region up to about one or two microns wavelength can be transformed into impurity photoconductors in the far infra-red by the addition of acceptor impurity atoms within aforementioned limits and maintaining the impure substances so obtained at a temperature substantially equal to that of liquid helium.

In operation the doped germanium infra-red detector as described herein makes it possible to detect radiation emanating from bodies that are at different temperatures from their surroundings at high scanning speeds with less appreciable conductivity effect than any heretofore known.

The invention described herein may be manufactured and used by or for the Government of the United States of America for governmental purposes without the payment of any royalties thereon or therefor.

What is claimed is:

1. In a device for the detection of long wavelength infra-red radiation, the combination comprising a specimen of germanium having an impurity between $10^{13}$ and $10^{18}$ atoms of zinc per cubic centimeter, means for subjecting said specimen to infra-red radiation, means for maintaining said specimen at a temperature substantially equal to absolute zero and means for determining the energy level of said specimen.

2. In a device for detection of long wavelength infra-red radiation, the combination comprising a specimen of germanium having an impurity between $10^{13}$ and $10^{16}$ atoms of copper per cubic centimeter, means for subjecting said specimen to infra-red radiation means for maintaining said specimen at a temperature substantially equal to absolute zero and means for determining the energy level of said specimen.

3. In a device for detection of long wavelength infra-red radiation, the combination comprising, a specimen of germanium having an impurity between $10^{13}$ to $10^{18}$ atoms per cubic centimeter of an element selected from the group consisting of zinc and copper, means for subjecting said specimen to infra-red radiation, means for maintaining said specimen at a temperature substantially equal to absolute zero, and means for determining the energy level of said specimen.

4. In a device for detection of long wavelength infra-red radiation, the combination comprising, a body of a homopolar substance having an impurity between $10^{13}$ to $10^{18}$ atoms per cubic centimeter of an element selected from the group consisting of zinc and copper, means for subjecting said body to infra-red radiation, means for maintaining said body at a temperature substantially equal to absolute zero, and means for determining the energy level of said body.

References Cited in the file of this patent

UNITED STATES PATENTS

| | | |
|---|---|---|
| 2,189,122 | Andrews | Feb. 6, 1940 |
| 2,514,879 | Lark-Horowitz et al. | July 11, 1950 |
| 2,547,173 | Rittner | Apr. 3, 1951 |